United States Patent [19]

Narducy et al.

[11] 4,145,374
[45] Mar. 20, 1979

[54] HIGH CLARITY BLENDS OF POLYCARBONATES WITH MERCAPTAN-MODIFIED GRAFT POLYMERS

[75] Inventors: Kenneth W. Narducy, Bloomingdale; John C. Falk, Chicago, both of Ill.; Murray S. Cohen, Convent Station, N.J.

[73] Assignee: Borg-Warner Corporation, Chicago, Ill.

[21] Appl. No.: 846,001

[22] Filed: Oct. 27, 1977

[51] Int. Cl.$^2$ .............................................. C08L 67/06
[52] U.S. Cl. ................................. 260/873; 260/880 R
[58] Field of Search .......................................... 260/873

[56] References Cited

U.S. PATENT DOCUMENTS

| | | |
|---|---|---|
| 3,162,695 | 12/1964 | Grabowski ............................ 260/873 |
| 3,310,540 | 5/1967 | Fang ...................................... 260/79.7 |
| 3,417,060 | 12/1968 | Brslow .................................... 260/999 |
| 3,852,394 | 12/1974 | Kubota ............................. 260/37 PC |
| 3,864,429 | 2/1975 | Tanaka ............................. 260/876 R |
| 3,880,783 | 4/1975 | Serini ........................................ 260/3 |
| 3,936,422 | 2/1976 | Wirth ................................... 260/78 S |

FOREIGN PATENT DOCUMENTS

| | | | |
|---|---|---|---|
| 49-132145 | 12/1974 | Japan ...................................... 260/873 |
| 49-132147 | 12/1974 | Japan ...................................... 260/873 |

*Primary Examiner*—Paul Lieberman
*Attorney, Agent, or Firm*—Richard J. Schlott

[57] ABSTRACT

Blends of polycarbonates with from 3 to about 10 weight per cent of a graft polymer having incorporated therein pendent phenalkyl groups exhibit markedly decreased notch sensitivity. The blends have remarkably high clarity and low haze.

3 Claims, No Drawings

HIGH CLARITY BLENDS OF POLYCARBONATES WITH MERCAPTAN-MODIFIED GRAFT POLYMERS

BACKGROUND OF THE INVENTION

The present invention relates to high clarity polycarbonate blends having reduced notch sensitivity characteristics and to a method for their preparation.

The thermoplastic polycarbonate resins are one of the most versatile thermoplastics. Their combination of transparency and toughness, heat resistance and dimensional stability gives the polycarbonate resins broad areas of applications.

The polycarbonates, however, are deficient with respect to notch sensitivity and several attempts have been made to cure this deficiency. For example, German Patent Application Ser. No. P1900756.8, filed Jan. 8, 1969 by Farbenfabriken Bayer AG, discusses the notch sensitivity characteristics of thermoplastic polycarbonates and discloses that the notch sensitivity can be partly overcome by blending with from 0.5 to about 9.5 parts by weight of a graft ABS polymer containing from about 50 to about 90 percent by weight of polybutadiene, about 5 to about 40 percent by weight acrylonitrile and about 5 to about 45 percent by weight of aromatic vinyl hydrocarbon. These and similar prior art blends suffer from a pronounced loss in transparency and from increased haze due to the presence of the modifier. The decreased clarity renders the blends less desirable for uses such as in glazing and lighting applications where light transmission is of substantial importance. A composition useful in preparing blends with polycarbonates which have improved notch sensitivity characteristics while retaining the excellent transmission and haze properties of polycarbonates would thus be a significant advance in the art.

SUMMARY OF THE INVENTION

It has now been found that small quantities of certain post-modified graft polymers dramatically improve the notch sensitivity characteristics of the polycarbonates without significantly affecting haze and light transmission properties. More particularly, it has been discovered that from about 3 to about 10 weight percent of certain post-modified graft polymers is sufficient to greatly decrease notch sensitivity characteristics.

Still more particularly, it has been found that certain graft polymers, when modified by a post reaction with certain phenalkyl mercaptans to incorporate pendant phenalkyl thioether groups in the graft polymers, are excellent modifiers for polycarbonates. Blends thereof exhibit good environmental stress cracking resistance and markedly decreased notch sensitivity without materially increasing the haze or lowering the light transmission properties.

DETAILED DESCRIPTION OF THE INVENTION

The high clarity polycarbonate blends of this invention are blends of from 90 to 97 wt percent polycarbonate with from 10 to 3 wt percent of a phenalkyl mercaptan-modified graft polymer.

THE POLYCARBONATES

The thermoplastic polycarbonates useful for the purposes of this invention are the polycarbonates prepared by converting di-(monohydroxyphenyl)-substituted aliphatic hydrocarbons with phosgene in a manner well known in the art. For example, British Pat. No. 772,627, Apr. 17, 1957, discloses suitable examples of the di-(mono-hydroxyphenyl)-substituted aliphatic hydrocarbons and the methods of converting these materials to polycarbonates. A typical polycarbonate useful in the present invention is the polycarbonate of 2,2-(4,4'-dihydroxydiphenyl)-propane, which has the following properties:

TABLE I

| | |
|---|---|
| Polycarbonate (Merlon E286F Mobay) | 100 |
| Powdered Polyolefin - (Microthene FN 510 - US Industrial Chemicals Co.) | 1 |
| Trinonyl Phenyl Phosphite | .25 |
| ⅛" Izod Impact Notch ft-lb/in 23° F | 15.0 |
| ¼" Izod Impact Notch ft-lb/in 23° F | 2.0 |
| ½" Izod Impact Notch ft-lb/in 23° F | 1.8 |
| Tensile Strength psi | 8575 |
| Tensile Elongation % | 170 |
| HDT (¼ × ½"; 264) ° F | 264 |
| Brabender Min. Torque M-GM | 1490 |
| Time at Min. Torque Min. | 30 |

The notch sensitivity of the polycarbonate is reflected in the sharp decrease in Izod impact properties in thickness, shown by the impact data for ⅛, ¼ and ½ inch thick specimens in Table I.

Other polycarbonates of di-(monohydroxyphenyl)-substituted aliphatic hydrocarbons in which both hydroxyphenyl groups are attached to the same carbon atom of the hydrocarbon exhibit notch sensitivity and will be improved when employed in blends according to the practice of this invention. Suitable polycarbonates of di-(monohydroxyphenyl)-substituted aliphatic hydrocarbons are, for example, the polycarbonates of (4,4'-dihydroxydiphenyl)-methane; 1,1-(4,4'-dihydroxydiphenyl)-cyclohexane; 2,2-(4,4'-dihydroxydiphenyl)-butane; 2,2-(4,4'dihydroxydiphenyl)pentane; 2,2-(4,4'-dihydroxydiphenyl)-hexane; and 2,2-(4,4'-dihydroxydiphenyl)-heptane, as well as mixtures thereof.

THE MODIFIED GRAFT POLYMERS

The modified graft polymers suitable for the purposes of this invention are conventional graft polymers which are modified by a post treatment with a phenalkyl mercaptan such as for example benzyl mercaptan, by which the mercaptan is incorporated into the graft polymer composition as phenalkyl thioether groups.

Graft polymers which are modified in a post-reaction may be prepared by the interaction, under polymerizing conditions, of styrene or a mixture of styrene and one or more additional vinyl monomers such as methylmethacrylate and acrylonitrile with a butadiene latex or a butadiene-styrene latex. The styrene or mixture of styrene with additional vinyl monomers comprises about 10 percent to 50 percent by weight of the graft copolymer and the latex component comprises about 90 percent to 50 percent by weight (dry basis). Where mixtures of methylmethacrylate with styrene are employed, the ratio of styrene to methyl methacrylate will preferably be from about 1:1 to about 1:3. The butadiene-styrene rubber latices useful for the purposes of this invention are copolymer latices wherein the styrene component comprises no more than about 40 percent by weight of the rubbery butadiene-styrene latex.

The modification of the graft polymers is accomplished by heating a graft polymer with the phenalkyl mercaptan in the presence of a free radical catalyst. The phenalkyl mercaptans suitable for the purposes of this invention include phenalkyl and substituted phenalkyl mercaptans having the following structure:

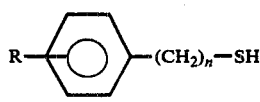

wherein R is hydrogen, lower alkyl or alkoxy, and n is an integer from 0 to 5. Representative phenalkyl mercaptans include for example, benzyl mercaptan (R=H, n=1), methoxybenzyl mercaptan (R=CH$_3$O, n=1) and 3-phenylpropyl mercaptan (R=H, n=3).

EXAMPLE 1

Preparation of a Graft Polymer

A graft polymer was prepared in accordance with the teachings of U.S. Pat. No. 3,671,610, by polymerizing a mixture of about 35 percent by weight of a monomer composition consisting of styrene and methylmethacrylate in a 1:1 weight ratio in the presence of 65 percent by weight of a butadiene-styrene copolymer comprised of 80 parts by weight butadiene and 20 parts by weight of styrene.

The butadiene-styrene copolymer latex was prepared by charging the following ingredients to a stainless steel reactor vessel:

| Ingredients | Grams |
| --- | --- |
| Butadiene | 800 |
| Styrene | 200 |
| Cumene Hydroperoxide | 1 |
| Divinyl Benzene | 5 |
| Distilled Water Solution | 3000 cc |
| Na-Bisoctyl Sulfosuccinate | 10 |
| EDTA-Disodium Mono-Hydrate | .05 |
| Formaldehyde Sodium Sulfoxylate | .05 |
| Ferrous Sulphide | .03 |
| Sodium Pyrophosphate | .15 |

The reactor was heated to 40° C. and allowed to react under agitation for 17 hours.

The following ingredients were then charged to the reactor containing the polymerized butadiene and styrene:

| Ingredients | Grams |
| --- | --- |
| Styrene | 270 |
| Methylmethacrylate | 270 |
| Cumene Hydroperoxide | 0.5 |
| Divinyl Benzene | 3 |
| Formaldehyde Sodium Sulfoxylate | 0.3 |
| Distilled Water | 1330 |

The resulting mixture was agitated at high speed for 30 minutes and then maintained at 60° C. under agitation for 5 hours, after which 135 grams of methylmethacrylate containing 0.2 gram of cumene hydroperoxide, 1.0 gram of distilled water were added to the reactor which was then agitated for 30 minutes. Thereafter, the mixture was agitated and maintained at 60° C. for a period of 5 hours.

An aliquot of the resulting latex was salted out at 50° C. with a 1 percent salt solution, further heated to 80° C. and filtered. The resultant powdered graft polymer particles were washed with water and dried. The yield was 98.5 percent.

EXAMPLE 2

Post-Modification of the Graft Polymer

A 3 liter resin kettle was charged with:

| | |
| --- | --- |
| Potassium Oleate (15% soln) | 40 g |
| Water | 320 g |
| Azo-bis-isobutyronitrile | 20 g |
| dissolved in toluene | 112 g |
| Benzyl Mercaptan | 400 g |

The mixture was vigorously stirred to emulsify the mixture, then 1088g of the latex of Example 1 (348g of resin) were added. The mixture was heated with stirring under nitrogen at 72° C. for 20 hours.

The latex was acid coagulated and the resin, collected by filtration, was washed with water, then with dilute aqueous sodium hydroxide (pH=10), then four times with water. The resin, after rinsing twice with methanol, was vacuum dried at 60° C. By analysis for sulfur content it was determined that 78% of the double bonds had added benzyl mercaptan.

PREPARATION OF THE BLENDS

Blends were typically prepared by adding a mixture of the polycarbonate and the modified graft polymer to a two-roll mill maintained at a temperature of 420° F., worked for 10–15 min., and sheeted out. The sheet was then compression molded into bar samples at 20,000 psi and at a temperature of 500° F.

Control blends of polycarbonate with the unmodified resin of Example 1 were prepared in a similar manner.

The impact, light transmission and haze data for a series of blends are summarized in Table II.

It will be apparent from these data that the post-modified graft polymer is effective in decreasing the notch sensitivity of polycarbonates (Example 3) over the range 3–10 wt %, (Examples 5–8) and provides marginal improvement even at the 1 wt % levels (Example 4). What is surprising is that unlike the behavior of the control modifier, the post modified graft resin does not increase haze or decrease light transmission below a level of about 10 wt %; compare Examples 4 with 9, 5 with 10, 6 with 11, 7 with 12 and 8 with 13. The blends prepared according to the method of this invention thus may be characterized as having substantially decreased notch sensitivity as compared with polycarbonate alone, while maintaining the desirable clarity and light transmission properties of the polycarbonate.

TABLE II

Blends of Polycarbonates with Modified Graft Polymer and with Unmodified Graft Polymer.

| Ex. No. | Modifier[1] Type | Wt% | Izod Impact[2] ⅛" bar | ¼" bar | Haze[3] (%) | Light[3] Trans. (%) |
| --- | --- | --- | --- | --- | --- | --- |
| 3 | None | 0 | 15.1 | 1.7 | 8 | 88 |
| 4 | Ex 2 | 1 | 14.8 | 3.0 | 7 | 85 |
| 5 | Ex 2 | 3 | 14.6 | 10.3 | 8 | 87 |
| 6 | Ex 2 | 5 | 15.1 | 12.1 | 9 | 87 |
| 7 | Ex 2 | 7 | 14.4 | 11.0 | 8 | 88 |
| 8 | Ex 2 | 10 | 12.7 | 11.2 | 18[4] | 79[4] |

Controls

TABLE II-continued
Blends of Polycarbonates with Modified Graft Polymer and with Unmodified Graft Polymer.

| Ex. No. | Modifier[1] Type | Wt% | Izod Impact[2] ⅛" bar | ¼" bar | Haze[3] (%) | Light[3] Trans. (%) |
|---|---|---|---|---|---|---|
| 9 | Ex 1 | 1 | 14.4 | 3.0 | 10 | 87 |
| 10 | Ex 1 | 3 | 13.8 | 14.4 | 26 | 84 |
| 11 | Ex 1 | 5 | 13.4 | 12.4 | 42 | 76 |
| 12 | Ex 1 | 7 | 13.6 | 11.8 | 42 | 78 |
| 13 | Ex 1 | 10 | 10.3 | 9.3 | 57 | 76 |

Notes:
[1] Modifiers of Example 1, unmodified MBS graft polymer (controls) and Example 2, MBS graft polymer containing 78% of theoretical benzyl mercaptan.
[2] Notched Izod impact, ft lbs/in notch, bar thicknesses of ⅛" and ¼".
[3] ASTM D 1003-61.
[4] Average of 3 samples.

A series of post-modified graft polymers with varying levels of benzyl mercaptan were prepared from the graft resin of Example 1 substantially employing the process of Example 2 but varying the amount of benzyl mercaptan. Blends of polycarbonate with the product post-modified graft polymers were prepared as before, employing 10 wt % modifier. The impact, haze and light transmission properties of the blends are summarized in Table III.

TABLE III
Polycarbonate Blends with 10 wt % Post-modified Graft Polymers Containing Varying Levels of Benzyl Mercaptan

| Ex. No. | Modifier[1] % BenzylSH | Wt % | Izod Impact[2] ⅛" bar | ¼" bar | Haze[3] (%) | Trans[3] (%) |
|---|---|---|---|---|---|---|
| 3 | Control | 0 | 15.1 | 1.7 | 8 | 88 |
| 14 | 54% | 10 | 12.9 | 11.9 | 18 | 82 |
| 15 | 67% | 10 | 13.9 | 12.4 | 15 | 79 |
| 8 | 78% | 10 | 12.7 | 11.2 | 18[4] | 79[4] |
| 17 | 85% | 10 | 13.4 | 12.1 | 20 | 78 |
| 13 | 0 | 10 | 10.3 | 9.3 | 57 | 76 |

Notes:
[1] % BenzylSH = % of theoretical benzyl mercaptan incorporated.
[2] Notched Izod impact, ft lbs/in notch; bar thicknesses of ⅛" and ¼".
[3] ASTM D 1003-61.
[4] Average of 3 samples.

Employing for comparison purposes the high level of 10 wt % modifier, it becomes apparent that blends with post-modified graft polymers at several levels of benzyl mercaptan incorporation have markedly lower haze and therefore greater clarity than a blend with an unmodified control (compare Examples 14, 15, 8 and 17 with Example 13).

EXAMPLE 18

A graft polymer latex, prepared as in Example 1, was post-modified using methoxybenzyl mercaptan substantially by the process of Example 2. The dried resin had incorporated 51% of the theoretical amount of methoxybenzyl mercaptan, as established by sulfur content.

A blend of polycarbonate containing 10 wt. % graft polymer was prepared by dissolving the polycarbonate in methylene chloride, adding the powdered graft polymer, thoroughly mixing and then precipitating the blend by pouring into methanol. The blend, after drying, was compression molded into test specimens having 24% haze and 83% light transmission.

EXAMPLE 19

A graft polymer latex, prepared as in Example 1, was post-modified substantially by the process of Example 2, but employing 3-phenylpropyl mercaptan. The amount of phenalkyl mercaptan incorporated was 82% of theoretical.

A blend of polycarbonate containing 10 wt % of the graft polymer was prepared by the solution process as in Example 18. The blend, after drying was compression molded into test specimens having 29% haze and 83% light transmission.

From the foregoing discussion and the Examples, it will be apparent that the invention is a blend of a polycarbonate with from about 3 to about 10 wt % of a post-modified graft polymer, the post-modification being accomplished by the reaction of phenalkyl mercaptan with a graft polymer of styrene and methylmethacrylate on a substrate of a rubbery butadiene polymer or a copolymer of butadiene and styrene. The amount of benzyl mercaptan incorporated will preferably be from about 50 to about 90% of the theoretical amount, based on ethylenic double bonds in the substrate. The product blends have markedly reduced notch sensitivity, good environmental stress cracking resistance and exhibit surprisingly good clarity as measured by a low haze level and high light transmission properties.

It will be apparent to those skilled in the art that further modifications and variations may be made, including but not limited to the addition of lubricants, heat and light stabilizers, colorants and dies as is commonly practiced in the art without departing from the spirit and scope of the invention.

We claim:

1. A composition comprising a blend of:
   A. 90 to 97 weight percent of the polycarbonate of a di-(monohydroxyphenyl)-substituted aliphatic hydrocarbon, and
   B. 10 to 3 weight percent of a graft polymer prepared by polymerizing from 50 to 10% wt of mixture of styrene and methyl methacrylate in the ratio of from 1:1 to 1:3 in the presence of from 50 to 90 wt % of a rubbery substrate selected from the group consisting of polybutadiene and styrene butadiene copolymers containing up to 40 wt % styrene, said graft polymer having incorporated therein from about 50 to about 90% of the theoretical amount based on ethylenic unsaturation of a phenalkyl mercaptan.

2. The composition of claim 1 wherein the phenalkyl mercaptan has the structure

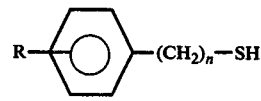

wherein R is hydrogen, lower alkyl or alkoxy and n is an integer from 0 to 5.

3. The composition of claim 1 wherein the phenalkyl mercaptan is selected from the group consisting of benzyl mercaptan, methoxybenzyl mercaptan and 3-phenyl propyl mercaptan.

* * * * *